April 25, 1961     R. G. HENDRICKSON     2,981,244
FUEL INJECTION CARBURETION SYSTEM Filed July 15, 1958     2 Sheets-Sheet 1

INVENTOR
R. G. HENDRICKSON

BY *H. Yates Dowell*
ATTORNEY

April 25, 1961  R. G. HENDRICKSON  2,981,244
FUEL INJECTION CARBURETION SYSTEM
Filed July 15, 1958  2 Sheets-Sheet 2

INVENTOR
R.G. HENDRICKSON

BY *H. Yates Dowell*
ATTORNEY

United States Patent Office 2,981,244
Patented Apr. 25, 1961

2,981,244
FUEL INJECTION CARBURETION SYSTEM
Ralph G. Hendrickson, 823 Dale Road, Glen Burnie, Md.
Filed July 15, 1958, Ser. No. 748,663
9 Claims. (Cl. 123—119)

This invention relates to the supplying or feeding of fuels for use in various ways including for consumption in internal combustion engines to which fuel is supplied and burned to produce power in the engine.

The invention relates particularly to fuel injection carburetion systems by means of which fuel is introduced or injected into an intake manifold from which it is distributed to the cylinders in accordance with requirements as determined by suitable control mechanism.

Heretofore, fuel has been supplied to the cylinders of internal combustion engines by means of single or multiple carburetors, by relatively expensive and complicated fuel injection systems that require particular skill in the installation and maintenance of the same and in which the cost of upkeep has been excessive.

It is an object of the invention to replace carburetors and complicated injection systems with a relatively simple, inexpensive, practical and efficient fuel injection carburetion system for an internal combustion engine.

Another object of the invention is to provide an injection system utilizing positive pressure so that fuel will be supplied uniformly to all cylinders under all conditions in the amount required.

A further object of the invention is to provide a fuel injection system so coordinated with the fuel enrichment control mechanism that the richness of the fuel will be maintained at the proper value and the amount of fuel supplied to the engine will be proper at all times during the operation of the engine.

Figure 1:
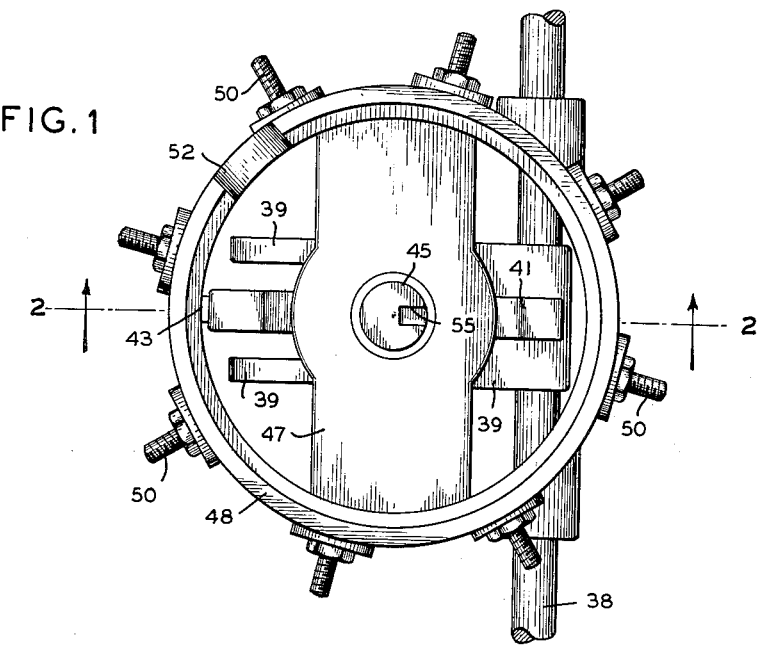
Figure 2:
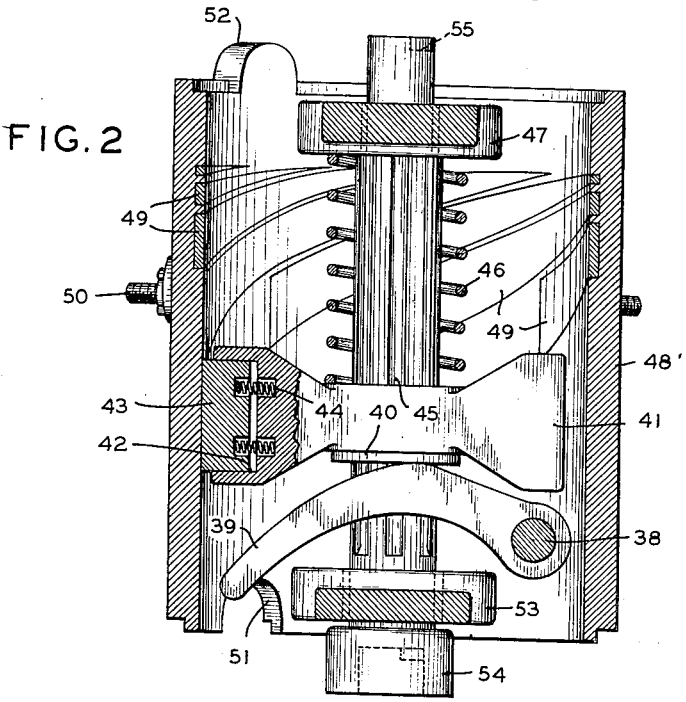
Figure 3:
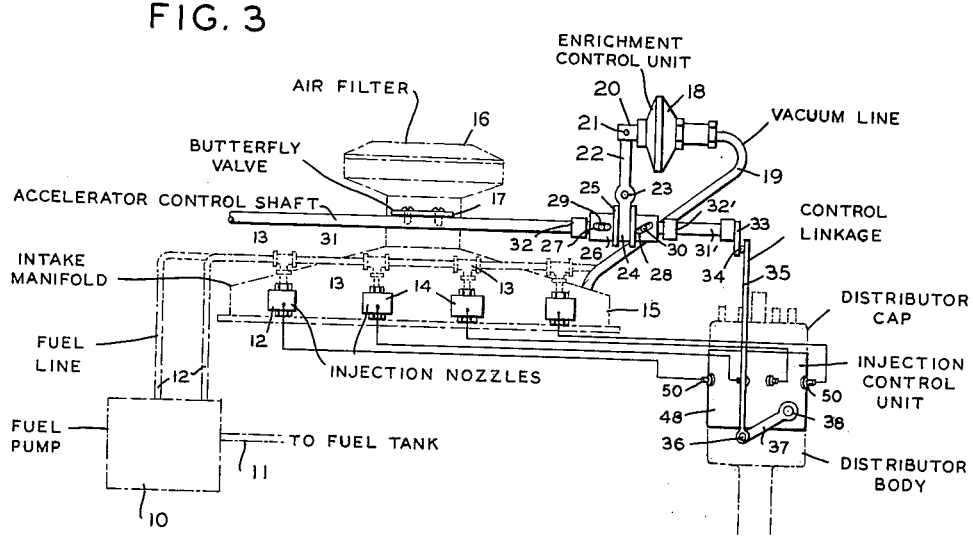
Figure 4:
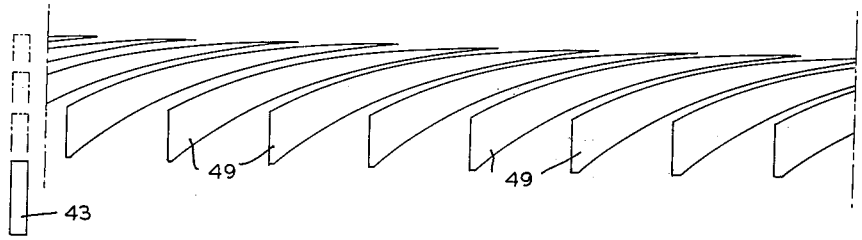
Figure 5:
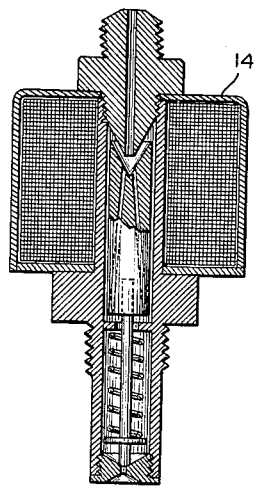

Other objects and advantages of the invention will be apparent from the following description taken in conjunction with the accompanying drawings wherein:

Fig. 1 is a top plan view of an injection control unit in accordance with the present invention;

Fig. 2, a vertical section on the line 2—2 of Fig. 1;

Fig. 3, a schematic illustration of the system;

Fig. 4, an enlarged developed view of the contact segments of the injection control unit; and Fig. 5, an enlarged vertical sectional view of one of the injection nozzles.

Briefly stated, the fuel injection carburetion system of the present invention comprises a fuel pump in which fuel is received from a fuel tank and is supplied through one or more fuel lines to a plurality of injection nozzles in an intake manifold. Air to be mixed with the fuel is admitted through an air filter under the influence or control of a manually operated butterfly valve. The volume of fuel admitted is subject to an enrichment control unit acting in accordance with the pressure in the manifold and which includes linkage connected to an injection control unit associated with the distributor body and the distributor cap or head. The injection control unit which constitutes an important part of the invention controls the amount of fuel supplied and the quality or richness of the fuel is determined by the enrichment control unit. The injection control unit includes a vertically adjustable rotor including a contact adapted to engage a series of tapered contact segments in a sleeve or housing, each contact segment being connected to a solenoid operated injection nozzle. The contact segments are inclined to the axis of the housing so that when the rotor is raised or lowered the length of time that the fuel is injected into the intake manifold will be varied.

With continued reference to the drawings the fuel injection carburetion system of the present invention is composed of a fuel pump 10 which receives fuel through a supply line 11 from a fuel tank not shown. Fuel is supplied under pressure by the fuel pump 10, through fuel lines 12, T-couplings 13, and fuel injection nozzles 14, into an intake manifold 15. Air for mixing with the fuel is admitted through an air filter 16 under the control of a manually-operated butterfly valve 17 connected to and rotated by a shaft 31. A fuel enrichment control unit 18 in the form of a bellows is actuated by pressure differential through a vacuum line 19 connecting the control unit to the intake manifold.

The control unit includes a movable post 20 connected by a pivot 21 with a rocker arm or lever 22 mounted on a pivot 23 and having a yoke 24 located between spaced rings or abutments 25. The rings 25 are attached to a sliding sleeve 26 provided with axial and diagonal slots 27 and 28 in which are received pins 29 and 30. The sleeve 26 slidably connects an accelerator control shaft 31 with an injection control unit shaft 31' by means of the pins 29 and 30, respectively. The shaft 31 is mounted in bearings 32 and rotated by a conventional foot accelerator pedal and appropriate linkage. The shaft 31' is mounted in bearings 32'.

The shaft 31' also is adapted to carry with it an arm 33 fixed to its extremity and which in turn is attached by a pivot 34 with control linkage 35 connected by a pivot 36 with the outer end of a lever arm 37 of the injection control unit. The lever arm 37 is fixed to a shaft 38 having an operating cam 39 fixed thereto which engages an anti-friction thrust bearing 40 on which is mounted a splined rotor 41 having a recess 42 in which is received a contact 43 urged radially outward by means of springs 44.

The bearing 40 and splined rotor 41 are mounted on a splined shaft 45 so that they may move axially of the shaft but normally they are urged toward the cam 39 by means of a helical spring 46 having one end engaging the rotor 41 and its opposite end engaging a support 47 across the diameter of a housing 48. A series of contact segments 49 are embedded in the housing 48 and are connected to binding posts 50. Each of the binding posts 50 are connected to and control one of the solenoid operated injection nozzles 14.

The housing 48 is adapted to be interposed between the body of the distributor and its cap and for this purpose is provided with a positioning recess 51 at the bottom of the housing 48 and a positioning boss 52 at the top of such housing for complementary engagement with the body and cap of the distributor. The lower end of the shaft 45 is mounted in a support 53 similar to the support 47 but inverted and is driven by a connection 54 keyed to the top of the distributor shaft. The distributor rotor, normally carried by the top of the distributor shaft, is positioned by a recess 55 in the top of the splined shaft 45. The location of positioning recess 51 and positioning boss 52 with relation to the leading edge of contact segments 49 is critical to insure proper timing of the start of the fuel injection cycle. Further, it is apparent that, with only slight modification, the injection control unit could be separately mounted and driven from any other appropriate power take-off point on the motor.

In the operation of the device, rotation of the accelerator control shaft 31 causes the sliding sleeve 26 to rotate shaft 31' and the linkage 33 and 35 joined by the connection 34 to raise and lower the arm 37. The arm 37 in turn rotates the shaft 38 and swings the operating cam 39 against the thrust bearing 40 to raise and lower the splined rotor 41 and the contact element 43 carried thereby to vary the position of the same with regard to the contact segments 49. At the same time the fuel enrichment control unit 18 is activated by pressure differential in the intake manifold to move the sleeve 26 axially of the shafts 31 and 31'. Due to the pins 29 and 30 acting in the slots 27 and 28, axial movement of the sleeve 26 causes a differential rotation or relative movement of the shafts 31 and 31' to vary the amount of fuel in the air distributed to the cylinders to compensate for road and load conditions.

In various embodiments of the invention, the contact segments 49 will differ as to size and shape, especially as to the shape of the following edge of the segment. Each contact segment will be designed to fit the operating characteristics of the class of engine which it is to control. Thus the basic fuel air ratio over the operating range of the engine is designed into the injection control unit. The enrichment control unit 18 simply over-rides this built-in fuel-air ratio to compensate for intermittent variations in power output required under operating conditions.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. For use with a fuel injection carburetion system having a series of injection nozzles, a manual fuel feed control and an automatic enrichment control for the ratio of fuel and air, mechanism for controlling the duration of the injection of the fuel, said mechanism including a body having a cylindrical chamber, a series of curved tapered contact segments within said chamber, a cooperative rotatable contact for engaging said segments and movable axially of said cylinder for varying the duration of engagement between said contact with said contact segments, said contact segments being connected to said injection nozzles of the system in a manner to control the operation thereof, and means for moving said rotatable contact relative to said contact segments subject to the operation of said manual fuel feed control and said automatic enrichment control.

2. For use with a fuel injection carburetion system having a series of injection nozzles, a manual fuel feed control and an automatic enrichment control for the ratio of fuel and air, mechanism for controlling the duration of the injection of the fuel through said injection nozzles, said mechanism including a body having a cylindrical chamber, a series of curved tapered contact segments within said chamber, a cooperative rotatable contact for engaging said segments and movable axially of said cylinder for varying the duration of engagement between said contact with said contact segments.

3. A fuel injection control unit comprising a generally cylindrical body having a cylindrical chamber, contact elements carried by said generally cylindrical body within the same, a cooperative rotatable contact for engagement with said contact elements, means for producing relative axial movement between said contact elements and said cooperative contact for varying the duration of engagement therebetween, and means whereby said contact elements may be connected to injection nozzles in a manner to control the operation of the latter.

4. A fuel injection control unit as set forth in claim 3 wherein adjacent said contact elements have their adjacent ends spaced from each other so that when said cooperative contact traverses said ends each said fuel injection nozzle will be operated individually, said contact elements having portions inclined to the axis of the cylindrical body, said inclined portions overlapping each other in an axial direction so that when said cooperative contact traverses said overlapping portions a plurality of fuel injection nozzles will be operated simultaneously.

5. In combination with the apparatus claimed in claim 3, a rotatable accelerator control shaft, a rotatable injection control unit shaft, linkage so connecting said injection control unit shaft to said contact that rotation of said injection control unit shaft produces said relative axial movement between said contact elements and said cooperative contact, means connecting said accelerator control shaft and said injection control unit shaft so that rotation of said accelerator control shaft produces rotation of said injection control unit shaft, and means for causing relative or differential rotation of said acceleration control shaft and said injection control unit shaft.

6. The invention as set forth in claim 5 and including a rotor within said body supporting said cooperative contact, said linkage including a cam pivotally secured to said generally cylindrical body and engaging said rotor, a lever connected for rotation in unison with said cam, an arm extending outwardly from said injection control unit shaft, and a link connecting said lever and said arm.

7. The invention as set forth in claim 5 and including a sleeve extending between adjacent ends of said accelerator control shaft and said injection control unit shaft, said sleeve having a pair of spaced slots formed therein with their lengthwise dimensions oblique to each other, a pin secured to said accelerator control shaft and extending into one of said slots, and a pin secured to said injection control unit shaft and extending into the other of said slots, and means for reciprocating said sleeve to cause relative rotation of said shafts.

8. The invention as set forth in claim 7 wherein said reciprocating means includes a pivoted rocker arm having one end engaging said sleeve, a bellows connected to the opposite end of said rocker arm, and means for connecting said bellows to the intake manifold of an engine.

9. A fuel injection control unit comprising an electrical contact segment connectable to a fuel injection nozzle in a manner to control the operation of the latter, said contact having divergent side portions, a cooperative electrical contact movable across said contact segment in a plurality of substantially parallel paths of different lengths between said divergent side portions, and means for shifting said cooperative contact with respect to said contact segment so as to engage any one of said substantially parallel paths.

References Cited in the file of this patent

UNITED STATES PATENTS

| 2,864,354 | Bartz | Dec. 16, 1958 |
| 2,948,272 | Woodward et al. | Aug. 9, 1960 |

FOREIGN PATENTS

| 971,274 | France | July 5, 1950 |

OTHER REFERENCES

SAE Journal, Electronic Brain Controls, Bendix Fuel Injection System (Winkler and Sutton), April 1957, pp. 26–29.